(12) United States Patent
Tardy et al.

(10) Patent No.: US 8,973,620 B2
(45) Date of Patent: Mar. 10, 2015

(54) CONNECTING ROD FOR A WEAVING LOOM AND WEAVING LOOM COMPRISING THIS CONNECTING ROD

(71) Applicant: Staubli Faverges, Faverges (FR)

(72) Inventors: Bastien Tardy, Argonay (FR); Julien Murat, Marlens (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 14/174,029

(22) Filed: Feb. 6, 2014

(65) Prior Publication Data

US 2014/0238526 A1    Aug. 28, 2014

(30) Foreign Application Priority Data

Feb. 25, 2013 (FR) ...................................... 1351641

(51) Int. Cl.
*D03C 9/06* (2006.01)
*F16C 7/06* (2006.01)
*D03C 1/14* (2006.01)

(52) U.S. Cl.
CPC . *D03C 1/144* (2013.01); *F16C 7/06* (2013.01); *D03C 9/0683* (2013.01)
USPC .................. 139/57; 139/82; 139/66 R; 74/105

(58) Field of Classification Search
CPC .......... D03C 1/14; D03C 13/00; D03C 1/144; D03C 2700/14; D03C 13/025; D03C 1/16; D03C 5/00; D03C 9/065; D03C 9/0683; F16C 33/605; F16C 7/00

USPC ................. 139/82, 57, 88, 115, 66 R; 74/105
See application file for complete search history.

(56) References Cited

U.S. PATENT DOCUMENTS

| | | | | |
|---|---|---|---|---|
| 3,741,257 | A * | 6/1973 | Kleiner et al. | 139/66 R |
| 3,991,793 | A * | 11/1976 | Demuth | 139/79 |
| 4,185,666 | A * | 1/1980 | Heiniger | 139/82 |
| 4,877,060 | A * | 10/1989 | Froment et al. | 139/82 |
| 6,113,330 | A * | 9/2000 | Rupflin | 411/339 |
| 6,145,548 | A * | 11/2000 | Fumex | 139/57 |
| 2002/0124901 | A1* | 9/2002 | Krumm | 139/57 |
| 2008/0205807 | A1* | 8/2008 | Fumex | 384/477 |
| 2014/0284917 | A1* | 9/2014 | Tiberghien et al. | 285/87 |

* cited by examiner

*Primary Examiner* — Bobby Muromoto, Jr.
(74) *Attorney, Agent, or Firm* — Dowell & Dowell, PC

(57) ABSTRACT

The connecting rod (6) for two articulations with parallel axes and for transmitting the rocking movements of an output lever of a shedding device to a heald frame belonging to a weaving loom, having a first connecting tip connecting to a first articulation and secured to a longitudinal bar, a second connecting tip (62) connecting to a second articulation and including members for clamping the bar that are accessible from one side of the connecting rod, and members (64) for separating the tips along a longitudinal axis (X6) of the connecting rod. The separating member having a bearing member (640) on an inclined surface (612; 630) whereof the normal is comprised in a plane (P6) perpendicular to the axes of the articulations and is inclined relative to the longitudinal axis (X6) of the connecting rod, while the bearing member (640) can be moved in a direction perpendicular to a plane (P34) containing the axes (X3, X4) of the articulations.

14 Claims, 7 Drawing Sheets

Figure 1:
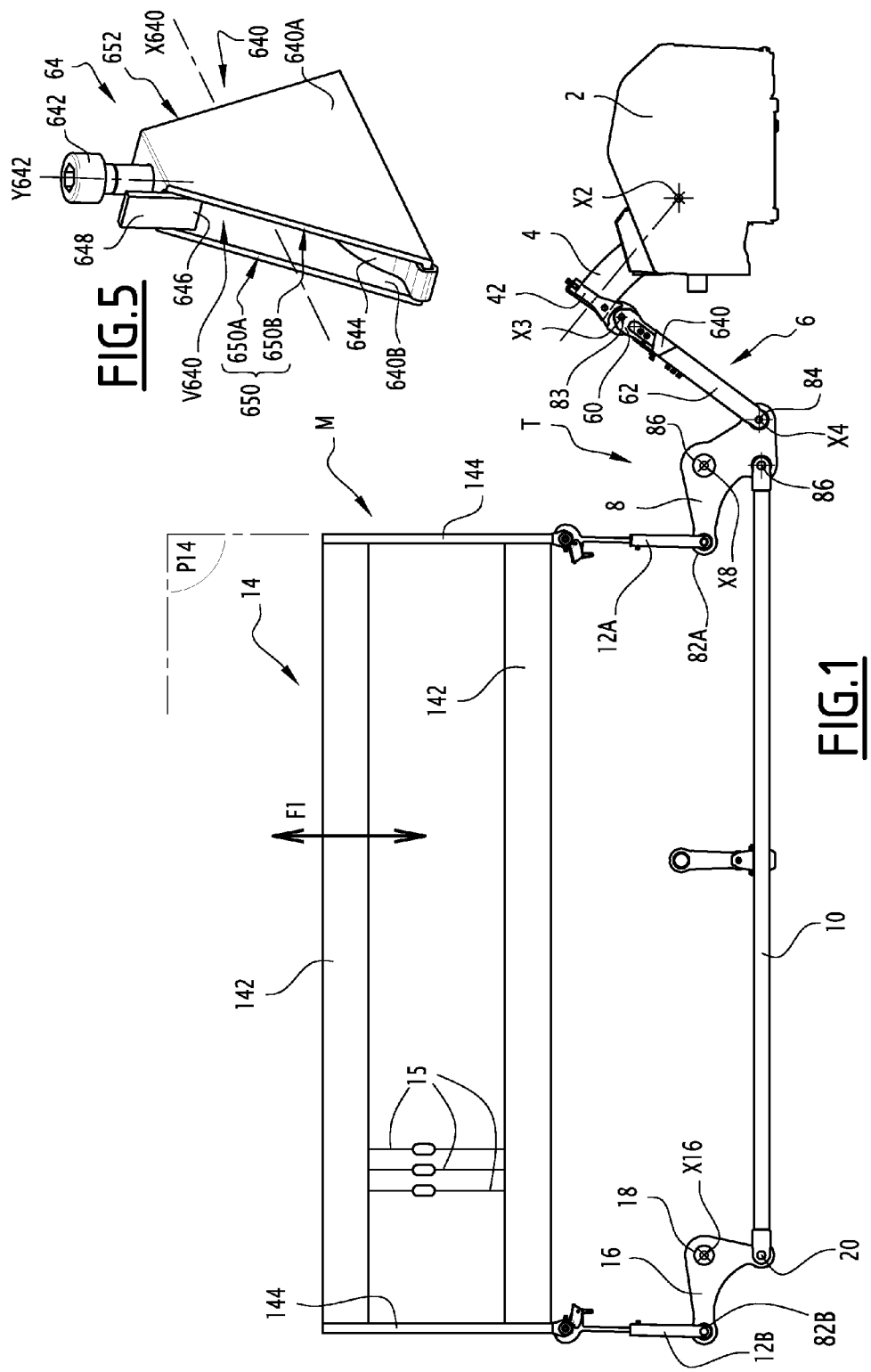

CONNECTING ROD FOR A WEAVING LOOM AND WEAVING LOOM COMPRISING THIS CONNECTING ROD

The invention relates to a connecting rod belonging to a lifting system for a weaving loom as well as a lifting system for a weaving loom comprising such a connecting rod and a weaving loom comprising such a lifting system. In the field of weaving, it is known to drive heald frames of a weaving loom using a shedding device, such as a dobby or fundamental weave system.

The invention particularly applies to the connecting rod attached to the shedding device.

This shedding device generally assumes the form of an assembly placed on the side of the weaving loom and comprising output levers positioned side-by-side and driven in programmable rocking movements with predetermined amplitudes. Each frame is connected to an output lever by means of a set of transmission elements articulated to each other. This assembly is called a lifting system. A heald frame and its associated lifting system have a very reduced bulk in the warp direction. This bulk is called the pitch and is generally limited to 12 mm.

On a weaving loom, the height of the sheet of warp, defined as the vertical distance from the ground to the sheet of warp at the intersections of the heald frames, is often adapted for the purposes of tension balance, based on the desired textile effects. It is therefore necessary to be able to adjust the height of each heald frame.

Means therefore exist for adjusting the height of a heald frame that intervene in lifting elements connecting the frame to the output lever. More specifically, WO-A-2005/121423 discloses a weaving loom in which the length of the connecting rods to the frame, i.e., the connecting rods situated just below a heald frame, is adjustable. This document discloses a connecting rod to the frame that is economical, but requires intervention at two points corresponding to the two ends of the heald frame. In fact, this connecting rod to the frame does not incorporate any device for maintaining its length. Thus, when the height of the heald frame is adjusted, it must be maintained to counterbalance the effects of gravity. In practice, adjusting the height of the heald frame requires two people to maintain the frame on the one hand and adjust the length of the connecting rod on the other hand.

To offset this drawback, it is known to act not on the connecting rod to the frame, but on the position of the articulation of the first connecting rod connected to the output lever of the shedding device and called actuating rod. To that end, it is known from EP-A-0,744,482 to use a shed-adjusting clip that is adjustably fastened on an output lever of a weave system. This clip is made from two interlocking stirrups that are movable relative to one another via a screw. The first supports clamping means on the output lever, while the second supports the articulation of the actuating rod of the lifting system. A construction based on the use of corners makes it possible to obtain simultaneous blocking of the clip in the output lever and relative immobilization of the two bolts. The height of the frame is adjusted by moving the bolts relative to one another in a direction globally orthoradial to the hinge pin of the output lever. This solution is very ergonomic, but this type of clip is fragile, since it is necessary to build two interlocking bolts in the pitch, i.e., in a small space. This is particularly delicate and costly to manufacture.

According to another alternative known from WO-A-2006/063687, the height of the frame is adjusted by acting on the length of an actuating rod that comprises a first connecting tip connecting to a first articulation and capable of sliding in a second connecting tip connecting to a second articulation that has means for clamping the first tip. The two tips are separated by acting on an adjusting screw, the axis of which is parallel to the longitudinal axis of the connecting rod. This adjusting screw is not positioned ergonomically, since the operator is hindered, during handling thereof, by adjacent connecting rods. Additionally, there is a smaller angular travel available to turn the key.

The invention more particularly aims to resolve these drawbacks by proposing a connecting rod with an adjustable length with a simplified and more ergonomic operation.

To that end, the invention relates to a connecting rod with two articulations with parallel axes and for transmitting the rocking movements of an output lever of a shedding device to a heald frame belonging to a weaving loom, said connecting rod comprising a first connecting tip connecting to a first articulation and secured to a longitudinal bar, a second connecting tip connecting to a second articulation and including means for clamping the bar that are accessible from one side of the connecting rod, and means for separating the tips along a longitudinal axis of the connecting rod. The separating means comprise a bearing member on an inclined surface whereof the normal is comprised in a plane perpendicular to the axes of the articulations and is inclined relative to the longitudinal axis of the connecting rod. The bearing member can be moved in a direction perpendicular to a plane containing the axes of the articulations.

Owing to the invention, it is possible to adjust the length of the connecting rod without being hindered by the adjacent connecting rods and at a single intervention point. The connecting rod includes simple and easy-to-use separating means. It saves on means, since it does not necessarily incorporate means for bringing the tips closer together.

According to advantageous but optional aspects of the invention, a connecting rod can incorporate one or more of the following features, in any technically allowable combination:

- The inclined surface belongs to at least one of the tips or to the bar.
- The normal oriented toward the outside of the inclined surface is inclined relative to the longitudinal axis of the connecting rod by an angle comprised between 20 and 50 degrees.
- The inclined surface is made on the bar.
- The bearing member is a corner that bears on the inclined surface of the bar.
- The bearing member is an adjusting screw.
- The bearing member is a stirrup, inserted between the first tip and the second tip and having an opening extending along an axis parallel to the longitudinal axis of the connecting rod and surrounding the bar.
- The stirrup includes at least one bearing surface, the normal of which is inclined relative to the longitudinal axis of the connecting rod.
- The stirrup includes an adjusting screw capable of moving the stirrup in a direction perpendicular to a plane containing the axes of the articulations of the connecting rods.
- The separating means comprise elastic return means for the stirrup opposing the action of the adjusting screw.
- The means for separating the tips of the connecting rod and the means for clamping the bar can be maneuvered from the same side of the connecting rod.
- The connecting rod is provided with means for indicating the separation between the two tips along the longitudinal axis.

The means for indicating the separation between the two tips along the longitudinal axis act between one of the tips and the means for separating the two tips.

The invention also relates to a weaving loom characterized in that it comprises a connecting rod as previously described.

Figure 2:
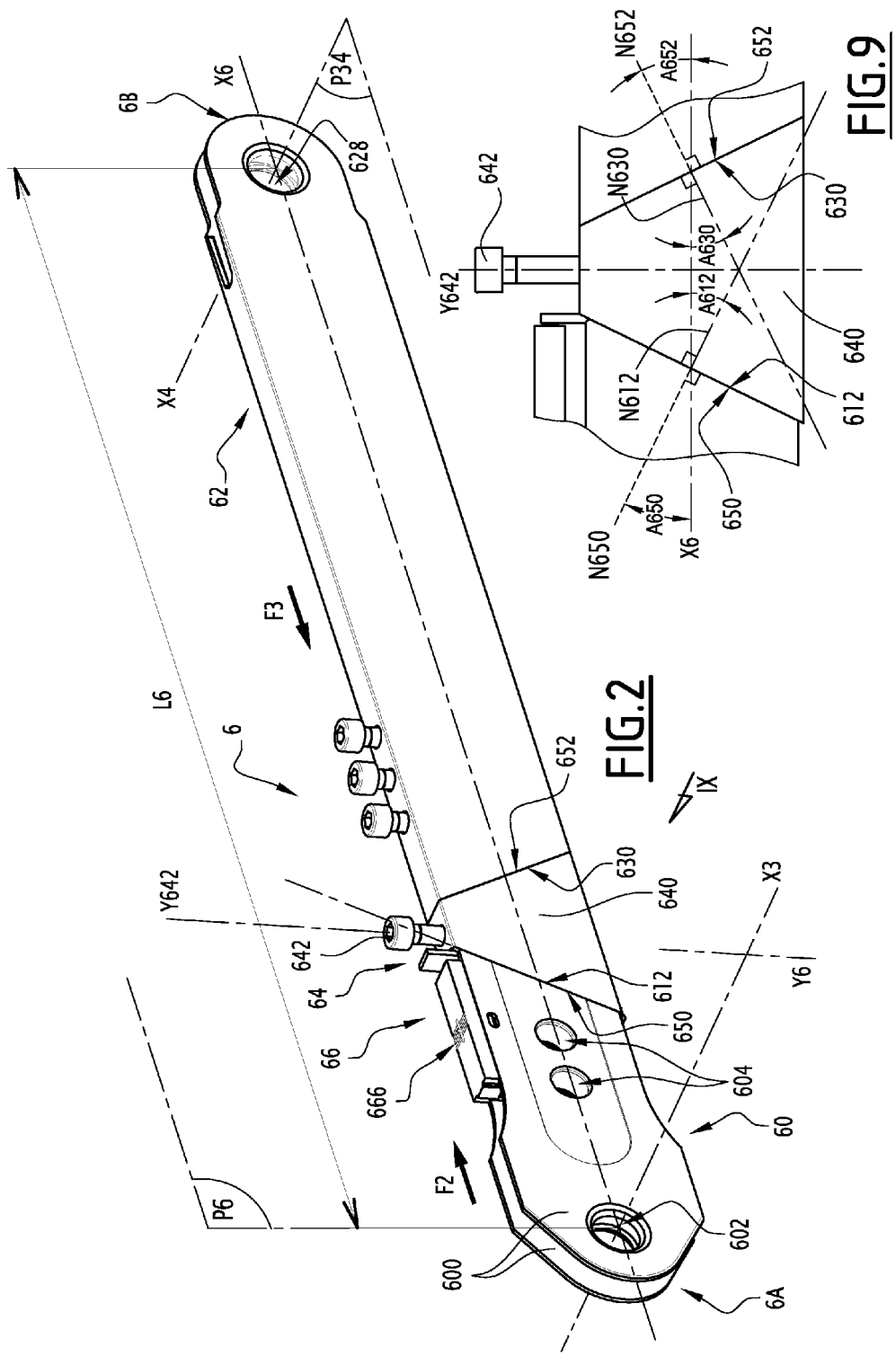
Figure 3:
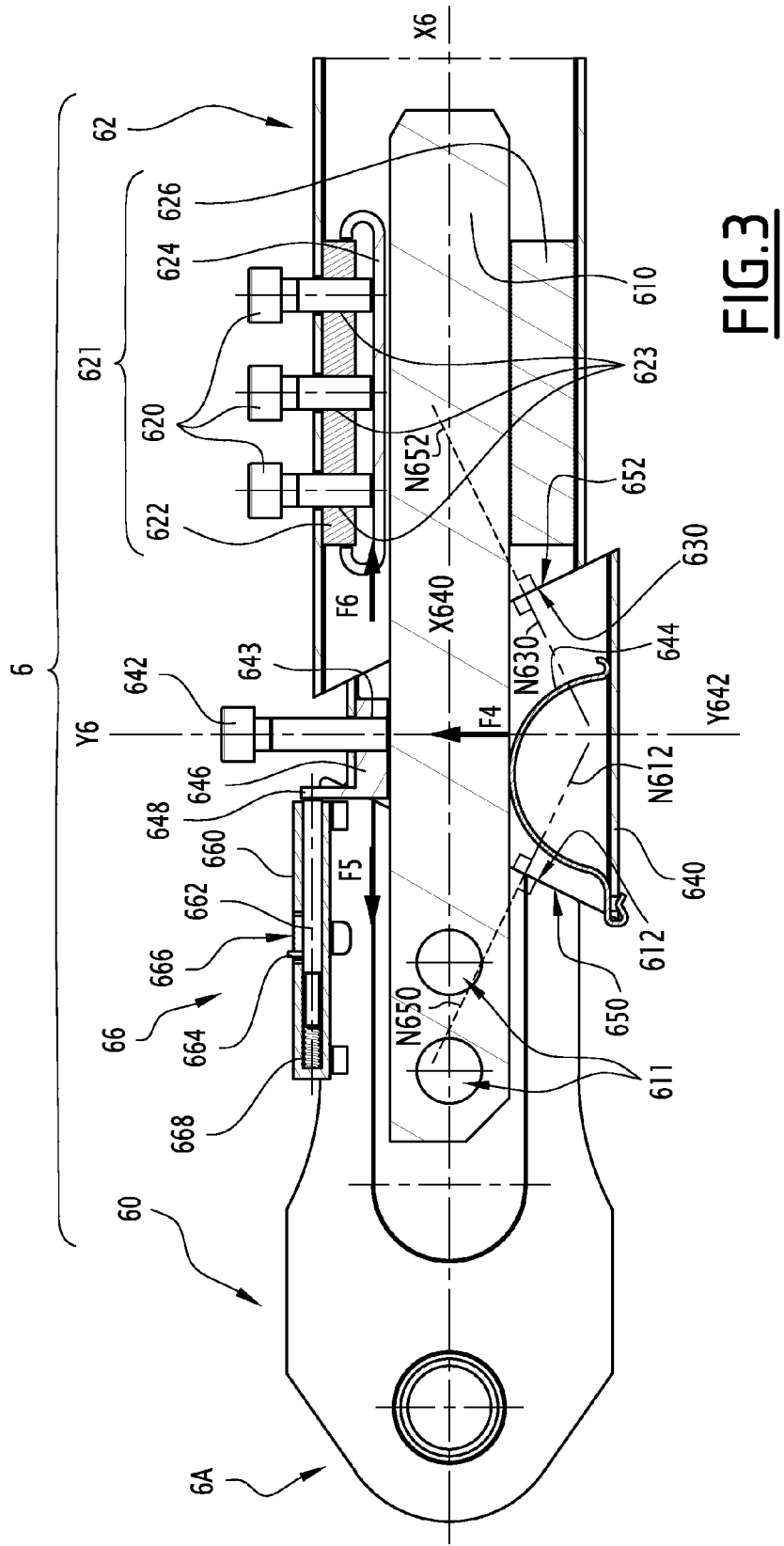
Figure 4:
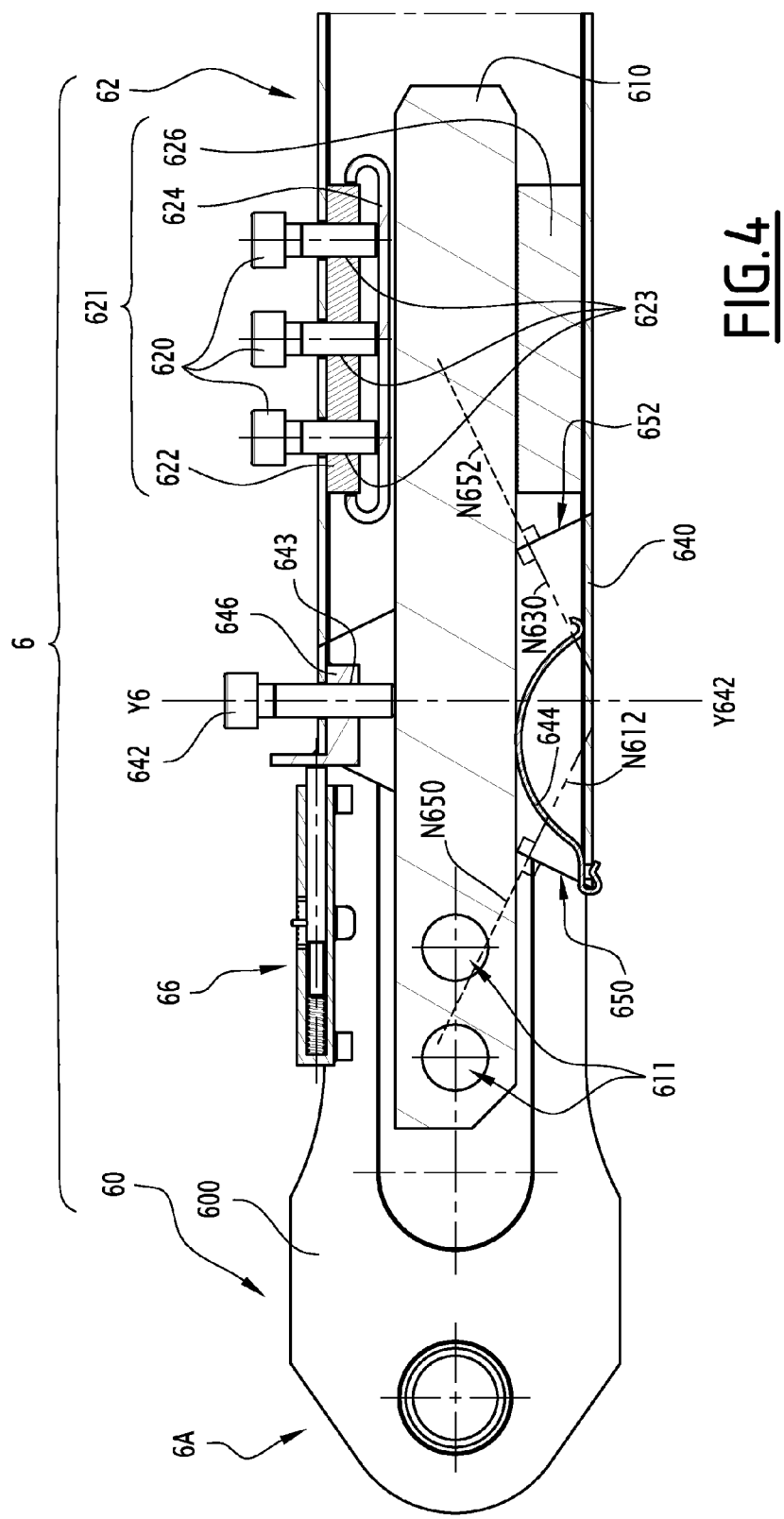
Figure 6:
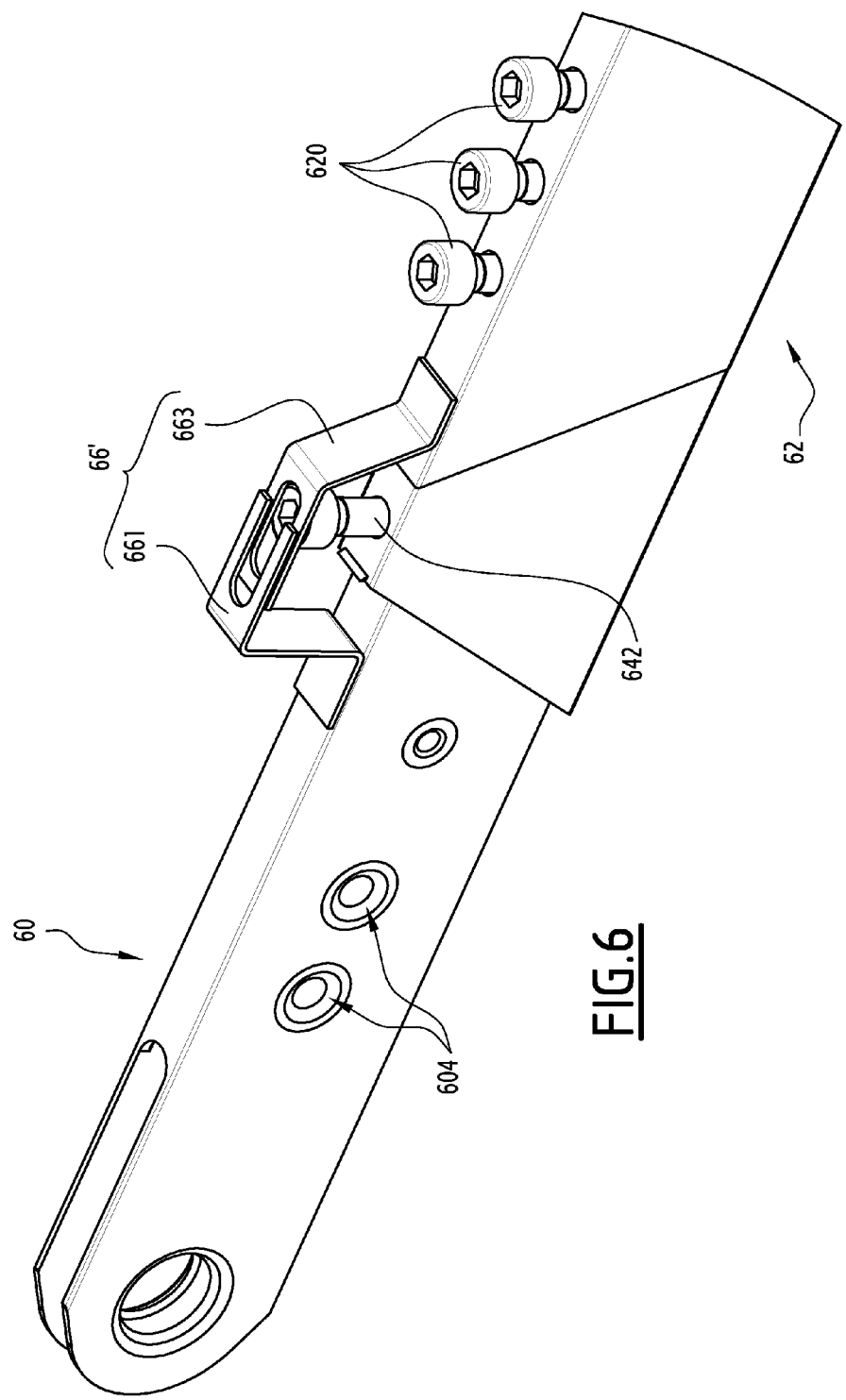
Figure 7:
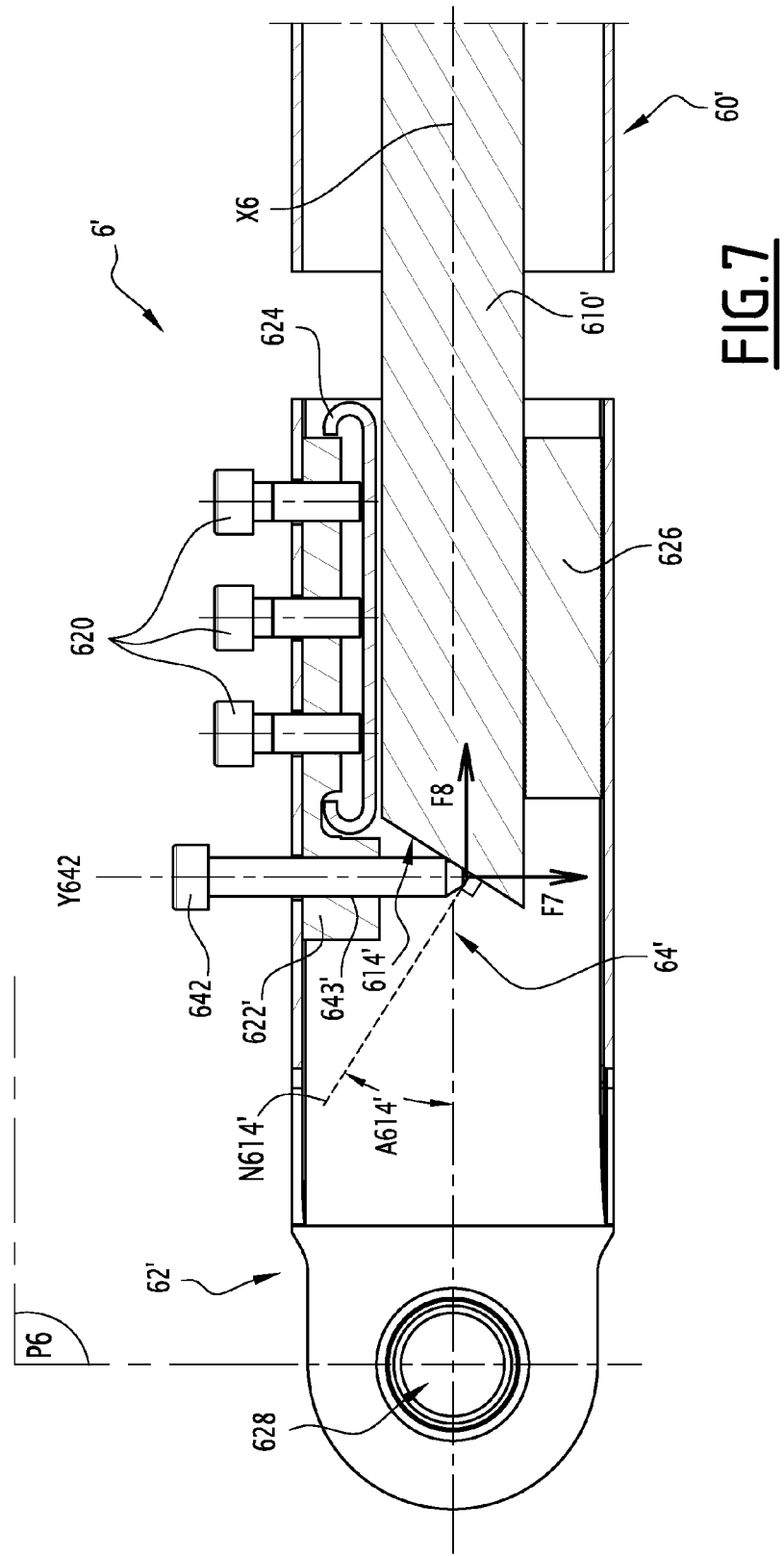
Figure 8:
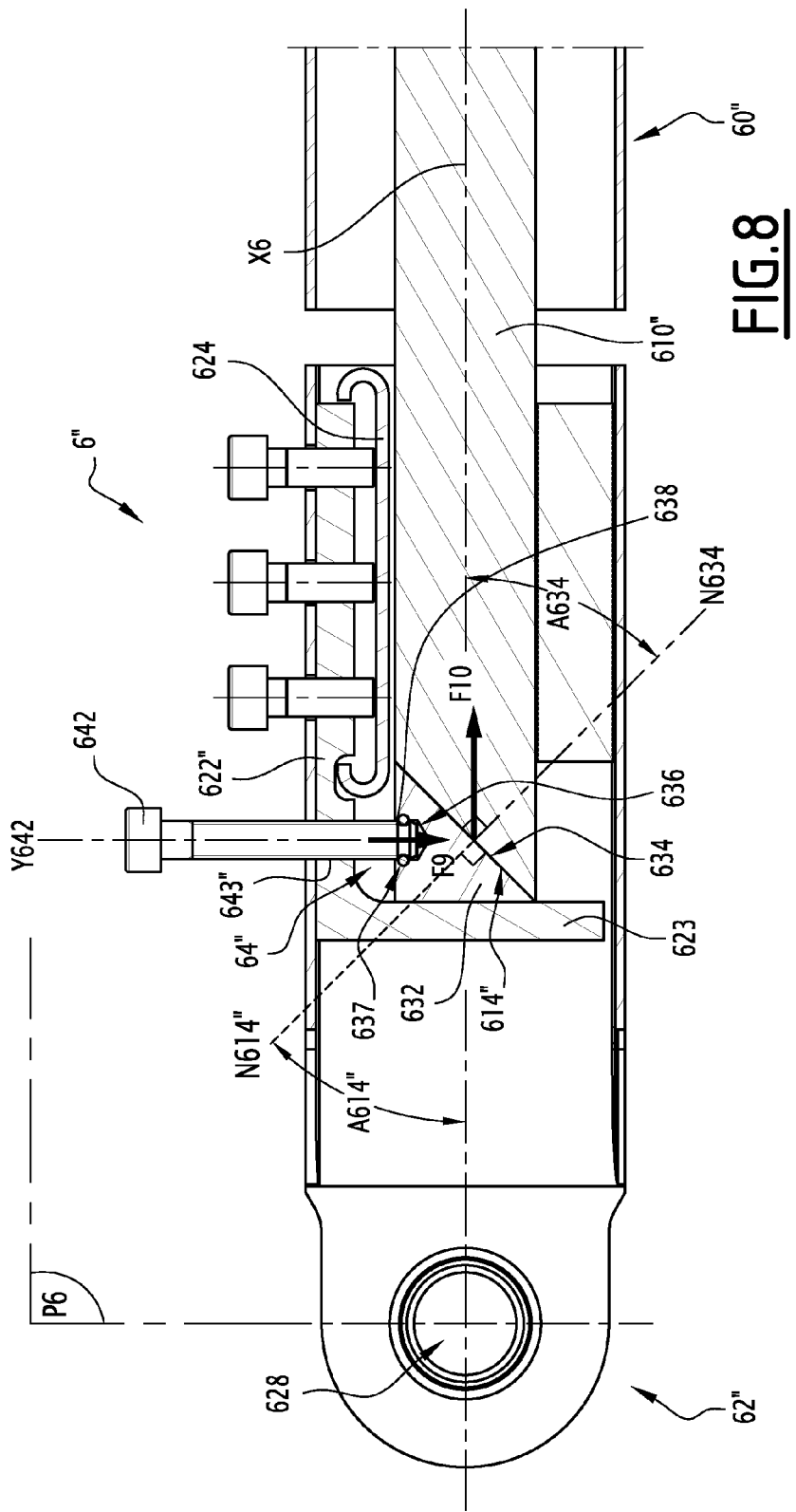

The invention will be understood and other advantages thereof will appear more clearly in light of the following description of four embodiments of a connecting rod according to its principle, provided solely as an example and done in reference to the appended drawings, in which:

FIG. 1 is a diagrammatic illustration of a weaving loom according to the invention, in a plane perpendicular to the warp yarns, FIG. 2 is a perspective view of a connecting rod according to the invention belonging to a weaving loom of FIG. 1, FIG. 3 is a longitudinal cross-section of the connecting rod of FIG. 2 in a first configuration, FIG. 4 is a longitudinal cross-section of the connecting rod of FIG. 2 in a second configuration, FIG. 5 is a perspective view of a stirrup belonging to the connecting rod of FIGS. 2 to 4, FIG. 6 is a partial view similar to FIG. 2, for a connecting rod according to a second embodiment of the invention, FIG. 7 is a partial longitudinal cross-sectional view of a connecting rod according to a third embodiment of the invention, FIG. 8 is a partial longitudinal cross-section of a connecting rod belonging to the weaving loom according to a fourth embodiment of the invention, and FIG. 9 is a partial view along arrow IX of FIG. 2.

FIG. 1 shows a weaving loom M according to the invention that comprises several heald frames 14, only one of which is visible in this figure, bearing reference 14. The heald frame 14 is formed by two uprights 144 and two crossbeams 142. A plane P14 is defined as the plane of the heald frame 14, said plane P14 is formed by two lines along which an upright 144 and a crossbeam 142 extend. This plane P14 is also the plane of FIG. 1. The frame 14 bears several tens, or even several hundreds of warp yarn guide heddles, three of which are shown in FIG. 1, bearing reference 15. For clarity of the description, a single heald frame 14 is shown in FIG. 1, whereas in reality, at least two heald frames are necessary to form a shed within the warp yarns. To create the shed, it is necessary to move the heald frame 14 in an alternating vertical movement, i.e., perpendicular to the sheet of warp. This movement is shown in FIG. 1 by a two-way arrow F1. This setting in motion is performed by a set of shed-adjusting clips, connecting rods, shafts and levers that are articulated to each other along axes perpendicular to the plane P14 and form a lifting system T belonging to the weaving loom M. The lifting system T is associated with a shedding device which, in the considered example, is a dobby 2. The dobby 2 includes, for each heald frame 14, an output lever 4 which, in the usage configuration, rocks in rotation around an axis X2 perpendicular to the plane of FIG. 1.

The output lever 4 is provided with a shed-adjusting clip 42 that supports an articulation 83 on which a first end of the connecting rod 6 connects. By clamping the shed-adjusting clip 42 at different heights on the output lever 4, the amplitude of the movements of the heald frame 14 is varied. A second end of the connecting rod 6 is connected to an articulation 84 supported by a lever 8 capable of rotating around a pivot 86 with a fixed axis of rotation X8 relative to the weaving loom M and normal to the plane P14. The lever 8 supports another articulation 82A on which the first end of a connecting rod to the frame 12A connects whereof the second end is connected to another articulation secured to the heald frame 14. The lever 8 furthermore has another articulation 86 on which the first end of a connecting rod 10 connects that extends horizontally below the heald frame 14 and whereof the second end connects to an articulation 20 supported by a lever 16 capable of rotating around a pivot 18 with a stationary axis of rotation X16 relative to the weaving loom and also normal to the plane P14. The lever 16 supports another articulation 82B on which a first end of the connecting rod to the frame 12B connects, the second end of which is connected to another articulation secured to the heald frame 14. All of the articulations use bearings to allow one lifting element T to rotate relative to another, around an axis perpendicular to the plane P14 of the heald frame 14. As a result, the rocking of the output lever 4 is transmitted to the levers 8 and 16 and is converted into a translational movement of the heald frame 14 in the direction F1. The lifting system T is designed such that the two connecting rods to the frame 12 have an identical vertical movement.

To be able to adjust the height of the heald frame 14 relative to the housing (not shown), use is made of the fact that the connecting rod 6 of the weaving loom M has an adjustable length and the direction along which the connecting rod extends or shortens is contained in the plane P14 of the heald frame 14.

This connecting rod 6 comprises a first connecting tip 60 connecting to the articulation 83 with axis of rotation X3 supported by the shed-adjusting clip 42 and a second tip 62 connecting to the articulation 84 with axis of rotation X4 supported by the lever 8. It extends along a longitudinal axis X6 that orthogonally intersects the axes of rotation X3 and X4 and belongs to the plane of the heald frame P14. Furthermore, Y6 denotes an axis contained in the plane of the lifting system T and that is perpendicular to the axis X6. Thus, a "longitudinal" direction of the connecting rod 6 is a direction considered parallel to the axis X6, whereas a "transverse" direction of the connecting rod 6 is a direction considered parallel to the axis Y6.

P6 denotes a plane containing the axes X6 and Y6. P34 denotes a plane containing the axes X3 and X4. The planes P6 and P34 are perpendicular.

The first tip 60 is formed by two flanges 600 riveted on a bar 610 that has a rectangular section and extends along the axis X6. The bar 610 comprises two through piercings 611 along axes parallel to the articulation axes X3 and X4, which are aligned with piercings 604 of the two flanges 600 during mounting. The rivets of the tip 60 are not shown, but in practice are inserted into the piercings 604 and 611 of the flanges 600 and the bar 610, respectively.

The second tip 62 is manufactured from a hollow tube with a rectangular section.

Each tip 60 and 62 respectively defines one end 6A and 6B of the connecting rod 6. L6 denotes the length of the connecting rod 6 measured parallel to the axis X6, between the articulation axes X3 and X4.

In the rest of the description, the "front" direction of the tip is considered to be the direction opposite the end of the connecting rod 6 defined by that tip, i.e., pointing toward the center of the connecting rod. The directions F2 and F3 in FIG. 2 each show the front direction of the tips 60 and 62, respectively. Thus, the first tip 60 comprises, at its rear end 6A, a through piercing 602 along the axis of rotation X3 and that allows the passage of connecting means at the articulation 83 supported by the shed-adjusting clip 42. Likewise, the second tip 62 comprises, at its rear end 6B, a through piercing 628 along the axis of rotation X4 that allows the passage of means for connecting to the articulation 84 of the lever 8.

In the front, the first tip 60 comprises a surface 612 that is machined in the thickness of the flanges 600 and whereof the normal N612 oriented from the piece toward the outside is inclined by an angle A612 relative to the longitudinal axis X6 of the connecting rod 6. Likewise, at its front end, the second tip 62 includes a surface 630 machined in the section of the hollow tube and whereof the normal N630 oriented from the piece toward the outside is inclined by an angle A630 relative to the axis X6. The normals N612 and N630 are comprised in the plane P6. The surfaces 612 and 630 are inclined with opposite slopes, but the value of the angle A612 is equal to the value of the angle A630.

In practice, the value of the angles A612 and A630 is chosen between 20° and 50°, preferably between 25° and 45°, still more preferably approximately 28°.

The connecting rod 6 also comprises separating means 64 along the axis X6, for separating the first tip 60 and the second tip 62. The separating means 64 comprise a stirrup 640 that is made from a hollow tube with a rectangular section that extends along an axis X640 and is cut transversely in two locations. In the configuration of the stirrup 640 mounted on the connecting rod 6, the axis X640 is parallel to or even combined with the axis X6 of the connecting rod. The two cut surfaces of the stirrup 640 are denoted 650 and 652. The surfaces 650 and 652 each have a normal N650 or N652 oriented from the piece outward and inclined, relative to a longitudinal axis of the tube in which the stirrup 640 was cut, identically to the normals N612 and N630 of the first tip 60 and the second tip 62, respectively. In other words, the incline angle A650 of the normal of the surface 650 oriented from the stirrup 640 outward and the incline angle A652 of the normal of the surface 652 oriented from the stirrup 640 outward, relative to the longitudinal axis X6, are respectively equal to the angles A612 and A630. The normals N612, N630, N650 and N652 as well as the angles A612, A630, A650 and A652 are better visible in FIG. 9.

As shown by FIG. 5, the surface 650 is formed by two unitary surfaces 650A and 650B that are each defined by a section of a wall 640A and 640B of the stirrup 640, on either side of an inner volume V640 of the stirrup in which the bar 610 is engaged belonging to the first tip 60 in the mounted configuration of the connecting rod 6. Likewise, the surface 652 is formed from two surfaces each defined by a section of one of the walls 640A and 640B. The unitary walls 650A, 650B and equivalent are suitable for being in surface bearing on the one hand on the flanges 600 and on the other hand of the large sides of the hollow tube forming the tip 62. The stirrup 640 is therefore a bearing member acting on the inclined surfaces 612 and 630.

In the rest of the description, the directions "upper" and "lower" refer to the configurations of FIGS. 3 to 8.

The stirrup 640 therefore has a globally triangular shape. It includes an adjusting screw 642 that is inserted transversely through the stirrup 640, in a tapping 643 provided in a spacer 646. This tapping 643 has a screw pitch complementary to that of the screw 642. The spacer 646 is secured to the upper edge of the stirrup 640, said upper edge being defined as the upper part in FIGS. 2 to 4. This spacer 646 is kept secured to the stirrup 640 by welding.

Y642 denotes an axis along which the screw 642 extends that bears on the bar 610 that protrudes longitudinally toward the front of the first tip 60. The axis Y642 is combined with the axis Y6 when the screw 642 is mounted on the stirrup 640. It should be noted that the axis Y642 is perpendicular to the axis X6 and is contained in the plane P14 of the frame 14. In this way, the screw 642 is easier to access and simpler to manipulate. The bar 610 passes through the stirrup 640 and is partially inserted in the second tip 62. The bar 610 is fastened to the first tip 60 by riveting between the two flanges 600. On the side opposite the adjusting screw 642, and inside the stirrup 640, a flexible blade 644 is inserted that bears on the one hand on the bottom of the stirrups 640, and on the other hand on the bar 610. This blade 644 is therefore a means for elastically returning the stirrup 640.

The second tip 62 includes clamping means 621 for clamping the tip 62 on the bar 610. Given that the bar 610 is secured to the first tip 60, the clamping means 621 therefore make it possible to secure the first tip 60 with the second tip 62. The clamping means 621 comprise three tightening screws 620 oriented parallel to the adjusting screw 642. These tightening screws 620 are inserted through holes formed in the wall of the tube in three tappings 623 pierced in a clamping plate 622. The tightening screws can be maneuvered from the same side as the screws for adjusting the length of the connecting rod. This makes the adjusting operation more ergonomic. Below the clamping plate 622 is a bearing blade 624. When tightened, the screw 620 therefore exerts downward pressure on the bearing blade 624. The bearing blade 624 is made from high-strength steel so as to avoid burring of the bar 610. Below the bar in FIG. 3, a flanging plate 626 is shown making it possible to keep the bar 610 in a vise. Tightening the screws 620 therefore results in closing the device formed by the flanging plate 626 and the bearing blade 624.

The first tip 60 also includes a separation indicator 66 that extends parallel to the axis X6 of the connecting rod 6. This separation indicator 66 comprises a housing 660 that is laterally fastened to the connecting rod 6 between the two flanges 600 of the first tip 60. The housing 660 contains a feeler finger 662 that outwardly bears a pin 664 oriented transversely to the axis X6 and parallel to the axis Y6. The feeler finger 662 bears on the one hand on a spring 668, and on the other hand on a curved part 648 of the spacer 646. The pin 664 protrudes from the housing 660 through a graduated slot 666 making it possible to measure the movement of the finger 662 relative to the housing 660.

FIGS. 3 and 4 show the connecting rod 6 in a shortened position and a separated position, respectively. During the adjustment of the length of the connecting rod 6, the tightening screws 620 should first be loosened so as to separate the bar 610 from the second tip 62 and, consequently, the first tip 60 from the second tip 62. Given the geometry of the lifting system T, the effect of gravity makes it possible to keep the first tip 60 and the second tip 62 bearing against the stirrup 640.

To increase the height of the heald frame 14, the length of the connecting rod 6 should be increased, for example by going from the configuration of FIG. 3 to the configuration of FIG. 4. To that end, the screw 642 is tightened in the tapping 643 of the spacer 646. The screw 642 bears on the bar 610, the latter therefore being immobile in translation, along the axis Y642, relative to the bar 610. This makes it possible, by matching the screw pitch, to move the spacer 646 upward in FIGS. 3 and 4, i.e., to move away from the bar 610. The spacer 646 is secured to the stirrup 640. Therefore, the latter also moves upward, i.e., relative to the bar 610, on the side of the adjusting screw 642. The stirrup 640 moves parallel to the axis Y6, i.e., perpendicular to the plane P34 containing the axes X3 and X4 of the articulations 83 and 84, and then pushes the first tip 60 and the second tip 62 backward. More specifically, due to the matching of their incline with the surfaces 612 and 630, the surfaces 650 and 652 transmit a longitudinal force separating the tips 60 and 62 along the axis X6. The surfaces 650 and 652 are therefore cam surfaces. Thus, the stirrup 640 acts as a corner that transmits the transverse force resulting from the tightening of the screw 642 into a longitudinal force. This is called a corner device. The transverse force is shown in FIG. 3 by the arrow F4, whereas the longitudinal forces exerted on the tip 60 and 62, respectively, are shown by arrows F5 and F6. The upward movement of the stirrup 640 means that the flexible blade 644 is compressed. The latter therefore exerts an upward elastic force on the bar 610.

Furthermore, during the movement parallel to the axis Y6, the stirrup 640 also moves, relative to each of the tips 60 and 62, parallel to the axis X6. The stirrup 640 can therefore be moved along the axes X6 and Y6 in the plane P6 relative to each of the tips 60 and 62.

In practice, for incline angles A650 and A652 equal to 28°, the adjustment range of the length L6 of the connecting rod 6 reaches 12 mm, for a transverse movement amplitude of the stirrup 640 equal to 11.3 mm. When the heald frame 14 is at the intersection of the sheet of warp, an increase of 6 mm in the length of the connecting rod L6 results in an increase of 8 mm of the height of the frame for a geometry of the lever 8 that places the axes of the articulations 84 and 82 at a distance of 150 mm and 200 mm from the axis X8 of the articulation 86, respectively.

Conversely, to lower the heald frame 14, the operator loosens the screw 642 from the stirrup 640. This unscrewing operation causes the screw 642 to stop bearing transversely on the bar 610. However, in the case of the lifting system T shown in FIG. 1, the effect of the weight of the frame 14 results in a compression force on the connecting rod 6. This compression force occurs along the longitudinal axis X6 of the connecting rod 6 and tends to bring the two tips 60 and 62 closer together, continuously. The surfaces 612 and 630 therefore continuously bear on the surfaces 650 and 652, respectively, of the stirrup 640.

Since the screw 642 has been loosened, the stirrup 640 is free to move parallel to the axis Y6, since it is not maintained by the bar 610. Thus, the compression force of the tips 60 and 62 results, due to the matching of the surfaces 612 and 630 with the surfaces 650 and 652 of the stirrup, in a transverse force transmitted to the stirrup 640. The surfaces 612, 630, 650 and 652 are all upwardly converging relative to the axis Y6. Thus, the stirrup 640 moves downward until the screw 642 comes into contact with the bar 610. In this way, continuous contact is provided between the screw 642 and the bar 610. In that case, the movement of the stirrup 640 is therefore simply due to gravity and the blade 644 serves no purpose.

However, by imagining a lifting system whereof the geometry does not cause the weight of the frame to result in a compression force on the connecting rod 6, loosening the screw 642 is not sufficient to move the stirrup 640. To that end, it is the blade 644 that makes it possible to move the stirrup 640 downward. More specifically, when the connecting rod 6 is in the separated position, i.e., in the configuration of FIG. 4, the blade 644 is transversely compressed. Thus, when the screw 642 is loosened, the only force applied on the bar is that of the elastic return of the blade 644. The bar 610 being immobile in the transverse direction, the blade 644 therefore pushes the stirrup 640 back downward, i.e., in the direction opposite the screw 642. The blade 644 therefore forms elastic return means for returning the stirrup 640 downward and play is created between the surfaces 650 and 612 and between the surfaces 630 and 652. The tips 60 and 62 are therefore brought closer together manually.

Owing to the use of this blade 644, the contact between the adjusting screw 642 and the bar 610 is ensured even if the two tips do not exert any force on the stirrup. In particular, the stirrup 640 is kept on the bar 610 in the case where the two tips 60 and 62 are separate. That is why the connecting rod 6 can be adapted to any lifting system geometry.

When the operator has reached a satisfactory adjustment of the height of the heald frame 14, he then tightens the tightening screws 620 so as to secure the first tip 60 with the second tip 62. The tightening of the screws 620 results in a force pushing the bearing blade 624 on the bar 610, which strengthens the clamping of the bar 610 in the vise formed by the clamping plate 622 and the bearing blade 624. Subsequently, it blocks the adjusting screw 642 by applying an additional tightening torque to it that guarantees that it will be immobilized during operation. By allowing the tips 60 and 62 of the connecting rod 6 to be separated and brought closer together by a predetermined value related to the position of the stirrup 640 along an axis perpendicular to the plane containing the two articulation axes, the separating means 64 constitute means for adjusting the length L6 of the connecting rod 6.

Once the length is adjusted, it is possible to know the value of the separation done owing to the indicator 66. More specifically, during the movement of the stirrup 640, the curved part 648 of the spacer 646 and the spring 668 simultaneously act on the feeler finger 662. In the case of shortening of the connecting rod 6, the feeler finger is pushed against the elastic force of the spring 668. The pin 664 supported by the finger 662 also moves in a graduated slot 666, and one thereby measures the progression thereof and therefore the value of the separation. Conversely, during the separating operation, the spring 668 relaxes by elastic return and pushes the finger 662 against the curved part 648 of the spacer 646. The movement of the finger 662, and therefore of the pin 664 through the graduated slot 666, makes it possible to witness the separation between the two tips.

In the second to fourth embodiments shown in FIG. 6 and following, the elements similar to those of the first embodiment bear the same references and operate in the same way. Hereinafter, we primarily describe the differences between these embodiments and the first.

FIG. 6 shows an alternative to the separation indicator 66 shown in FIGS. 2 to 4. The separation indicator 66' of this embodiment is formed by two curved blades 661 and 663 that are fastened on the first tip 60 and the second tip 62, respectively. The separation between the two tips 60 and 62 can therefore be measured directly by the separation between the two blades 661 and 663.

The third embodiment shown in FIG. 7 differs from the first two inasmuch as the connecting rod 6 does not include a stirrup and as it is a bar 610' belonging to the first tip 60' that includes, on its front end, a surface 614' whereof the normal N614' oriented toward the outside of the bar 610' is inclined by an angle A614' relative to a longitudinal axis X6 of the connecting rod 6. The normal N614' is comprised in a plane P6 of the connecting rod defined as in the first embodiment. The first tip 60' is secured to the bar 610' by means that are not shown. The separating means 64' along the axis X6 of the first tip 60' and the second tip 62' of the connecting rod 6' include a screw 642 inserted into a tapping 643' formed in a clamping plate 622', transversely to the axis X6, said plate 622' being immobilized in the second tip 62'. The screw 642' bears on the inclined surface 614' of the bar 610'. Thus, in this embodiment, the screw 642 constitutes the bearing member that acts on the inclined surface 614' of the bar 610'. The clamping plate 622' acts both on the adjustment of the separation and the clamping, since it supports the tightening screws 620 to cooperate with the bearing plate 624 as in the first embodiment. Tightening the screw 642 makes it possible to exert a transverse force F7 of the tightening screw 642 on the inclined surface 614' of the bar 610'. This force is transformed, owing to the use of the inclined surface 614', into a longitudinal force F8 and makes it possible to move the bar 610' backward. Furthermore, this transmission of movement is possible because the bar 610' is not yet clamped in the vise formed by the clamping plate 622 and the flanging plate 626. In other words, the clamping plate of the bar 610' is such that the bar 610' is capable of sliding relative to the second tip 62 in a direction longitudinal to the axis of the connecting rod. The bar 610' being secured to the first tip 60, a movement of the first tip 60' relative to the second tip 62' is therefore obtained. Loosening the screw 642 makes it possible to bring the two tips 60' and 62' closer together again. In the case where the connecting rod 6' is used as actuating rod of a lifting system T as illustrated in FIG. 1, this coming closer together is simply due to gravity and occurs continuously throughout the loosening of the screw 642.

FIG. 8 shows a fourth embodiment of the invention. This embodiment shows a connecting rod 6" that differs from the two previous ones at its separating means 64" along the axis X6 of its tips 60" and 62". The adjusting screw 642 bears on a corner 632 having a front surface 634, which is inclined in a manner complementary to a surface 614" of a bar 610" belonging to the tip 60". There is therefore a corner device, as in the first embodiment. To that end, the corner 632 includes a bore 636 for receiving the end of the screw 642. The bore 636 includes a circular groove 637 suitable for housing an elastic retaining ring 638 positioned around the screw 642. In this way, the corner 632 is secured in axial translation along the axis Y642 between the screw 642 and the corner 632. The angle between the normal N614" of the surface 614" oriented toward the outside of the bar 610" and the axis X6, and the angle between the normal N634 of the surface 634 oriented toward the outside of the corner 632 and the axis X6 in the plane of FIG. 7, is denoted A614" and A634, respectively. The angles A614" and A634 have the same value, which may be the same as in the first embodiment. The normal N614" is comprised in a plane P6 defined as in the first embodiment.

The transverse force F9 exerted by the screw 642 on the corner 632 results, by matching the surfaces 634 and 614", in a longitudinal force F10 exerted by the corner 632 on the bar 610". Similarly to the connecting rod 6', the clamping play of the bar 610" allows the bar 610" to slide in the longitudinal direction of the connecting rod. In this way, a separation is created between the first tip 60" and the second tip 62". Furthermore, the connecting rod 6" includes a clamping plate 622" that is used both for the adjustment and the clamping, since it comprises a tapping 643" for receiving the adjusting screw 642. The plate 622" further includes a tab 623 that extends transversely to the axis of the connecting rod 6". This tab 623 makes it possible to guide the corner 632 parallel to the axis Y642. Similarly to the first embodiment, once the length is adjusted, the clamping means 621 should be maneuvered to immobilize the tips 60" and 62" relative to one another.

In the third and fourth embodiments, the screw 642 and the corner 632 move perpendicularly to a plane containing the articulation axes of the connecting rod at its ends, that plane being equivalent to the plane P34 of the first embodiment.

According to an alternative applicable to all of the embodiments, the tightening screw 642 is inclined by an angle of approximately 30° relative to the transverse axis Y6 of the connecting rod 6. This may improve accessibility, but has the drawback of requiring additional adjusting screw turns to obtain the same separation as with the use of a screw strictly perpendicular to the longitudinal axis X6 of the connecting rod 6.

According to another alternative, it is possible to use a fundamental weave system in place of the dobby 2.

According to another alternative, the variable-length connecting rod 6 is not positioned at the output of the shedding device 2, but at another location of the lifting system T, for example as the connecting rod to the frame.

According to an alternative applicable to the first two embodiments, a single inclined surface is present on a tip as well as on the stirrup 640 to produce a separation between the two tips 60 and 62. The adjusting range is then two times lower than in the first two embodiments of the invention.

According to another alternative, the spacer 646 is kept secured to the stirrup 640 by jamming.

According to another alternative, the separating means 64 do not include a flexible blade 644.

The technical features of the embodiments and alternatives considered above may be combined with each other to provide new embodiments.

The invention claimed is:

1. A connecting rod with two articulations with parallel axes and for transmitting the rocking movements of an output lever of a shedding device to a heald frame belonging to a weaving loom, said connecting rod comprising
   a first connecting tip connecting to a first articulation and secured to a longitudinal bar,
   a second connecting tip connecting to a second articulation and including means for clamping the bar that are accessible from one side of the connecting rod, and
   means for separating the tips along a longitudinal axis of the connecting rod,
characterized in that
   the separating means comprise a bearing member on an inclined surface whereof the normal is comprised in a plane perpendicular to the axes of the articulations and is inclined relative to the longitudinal axis of the connecting rod, and
   the bearing member can be moved in a direction perpendicular to a plane containing the axes of the articulations.

2. The connecting rod according to claim 1, wherein the inclined surface belongs to at least one of the tips or to the bar.

3. The connecting rod according to claim 1, wherein the normal oriented toward the outside of the inclined surface is inclined relative to the longitudinal axis of the connecting rod by an angle comprised between 20 and 50 degrees.

4. The connecting rod according to claim 3, wherein inclined surface is made on the bar.

5. The connecting rod according to claim 4, wherein the bearing member is a corner that bears on the inclined surface of the bar.

6. The connecting rod according to claim 4, wherein the bearing member is an adjusting screw.

7. The connecting rod according to claim 1, wherein the bearing member is a stirrup, inserted between the first tip and the second tip and having an opening extending along an axis parallel to the longitudinal axis of the connecting rod and surrounding the bar.

8. The connecting rod according to claim 7, wherein the stirrup includes at least one bearing surface, the normal of which is inclined relative to the longitudinal axis of the connecting rod.

9. The connecting rod according to claim 7, wherein the stirrup includes an adjusting screw capable of moving the stirrup in a direction perpendicular to a plane containing the axes of the articulations of the connecting rods.

10. The connecting rod according to claim 9, wherein the stirrup includes elastic return means for the stirrup opposing the action of the adjusting screw.

11. The connecting rod according to claim 1, characterized in that the means for separating the tips of the connecting rod and the means for clamping the bar can be maneuvered from the same side of the connecting rod.

12. The connecting rod according to claim 1, wherein the connecting rod is provided with means for indicating the separation between the two tips along the longitudinal axis.

13. The connecting rod according to claim 12, wherein the means for indicating the separation between the two tips along the longitudinal axis act between one of the tips and the means for separating the two tips.

14. A weaving loom wherein it comprises a connecting rod according to claim 1.

\* \* \* \* \*